Feb. 19, 1952     H. G. HARTMAN     2,586,428
GEAR CUTTER

Filed May 31, 1946

HERBERT G. HARTMAN
INVENTOR.

Feb. 19, 1952        H. G. HARTMAN        2,586,428
GEAR CUTTER

Filed May 31, 1946        2 SHEETS—SHEET 2

HERBERT G. HARTMAN
*INVENTOR.*

BY *B. Schlesinger*

Patented Feb. 19, 1952

2,586,428

UNITED STATES PATENT OFFICE 2,586,428

GEAR CUTTER

Herbert G. Hartman, Irondequoit, N. Y., assignor to Gleason Works, Rochester, N. Y., a corporation of New York Application May 31, 1946, Serial No. 673,382

7 Claims. (Cl. 29—105)

The present invention relates to rotary cutters and particularly to inserted blade type face mill cutters such as are used in the cutting of spiral bevel and hypoid gears for automotive and other precision industrial purposes. This application is a continuation-in-part of the pending application of Herbert G. Hartman, Serial No. 655,633, filed March 19, 1946, and now Patent No. 2,506,082, granted May 2, 1950.

In order to achieve quietness in operation and maximum load-carrying capacity, it is necessary to cut automobile and other precision type gears to accuracies of within a few thousandths of an inch. Where a face mill cutter is employed in the cutting operation, this requires that the blades of the cutter be at the correct radial distances from the axis about which the cutter rotates, within limits measured in hundred-thousandths of an inch.

Correct positioning of the blades of the cutter is required, also, to insure against some blades having to do disproportionate shares of the cutting and, therefore, dulling faster than other blades. This is especially important because the blades of a face mill gear cutter are relieved back of their side-cutting edges and the relieved side surface of each blade is at a progressively varying distance from the axis of the cutter. When one blade is sharpened back, then, all of the blades have to be sharpened back an equal amount so that the new cutting edges of the blades will all have correct radial distances from the axis of the cutter. Hence, if one blade dulls faster than the others, not only is more frequent sharpening required, but a great deal of the useful life of the blades is wasted.

Inserted blade type face mill cutters have a rotary head, and a plurality of cutting blades, which extend in the general direction of the axis of the head. The blades are mounted in slots, provided around the periphery of the head, so that the cutting portions of the blades project beyond one side face of the head. In the conventional type cutter, each blade is provided with a shoulder that is adapted to seat against one side face of the cutter head to determine the distance which the cutting portion of the blade projects beyond said side face. In addition, the sides of the blade-receiving slots have contact for their full radial lengths with the sides of the blades; and to effect radial adjustment of the blades in their slots, shims and wedges are provided, which are interposed between the inside faces of the blades and the inside or bottom walls of the slots.

It is a costly operation to grind a shoulder on each blade, and not easy to get all shoulders ground alike within the limits of accuracy required. Moreover, with the conventional construction, when a blade is fastened in its slot by tightening up on the binder bolt which secures it in its slot, the blade tends to expand the slot and compress the metal between successive slots. The result is that there is a much tighter fit between the last blade put in the cutter head and its slot than there is between other blades and their slots, and trouble is frequently encountered in getting the last blade into the cutter head, and in positioning it accurately in the correct radial position in the head.

Moreover, it is a long, difficult task to true up the blades of the conventional type face mill cutter. In truing such a cutter, the blades are first trued as accurately as possible on a special truing fixture, and then best practice requires that they be trued again when the cutter is mounted on the gear cutting machine. The latter operation is done because the axis of the tool spindle of the gear cutting machine may not coincide with the axis about which the blades were trued on the truing fixture. These truing operations are performed not only when the cutter is new, that is, the first time that it is used, but in the best practice, after each sharpening of the cutter.

In truing on the truing fixture, the cutter is secured to the spindle of the fixture and each blade is individually tested to see whether it is at the correct radial distance from the axis of the spindle. If a blade is not in the correct position, the operator changes the shim or shifts the wedge which is interposed between the blade and the body of the cutter.

In truing the cutter on the gear cutting machine, the same operations are performed, but with these differences that while the standard truing fixture is provided with means for locking the cutter against rotation during testing of the radial position of each blade and during adjustment of the radial position of the blade if adjustment is required, and while, the truing fixture has means for insuring that blades, which have corresponding side cutting edges (outside or inside), are tested at corresponding points in their side surfaces so that all may be tested alike, the conventional gear cutting machine has neither of these features. When he trues a conventional face mill gear cutter on a gear cutting machine, the operator has to rely wholly on his skill.

Aside from the difficulty of the job, it is time-consuming to true and adjust the blades of a face mill cutter on a gear cutting machine. Moreover, whatever time is consumed in the truing operation on the cutting machine is time during which a very costly machine is tied up, not doing useful work.

One object of the present invention is to provide an improved form of face mill gear cutter which can be trued more accurately and faster than any such cutter heretofore built.

Another object of the invention is to provide an inserted blade type face mill cutter which will be cheaper to manufacture and cheaper to use than previous types of such cutters.

Another object of the invention is to provide an inserted blade type face mill cutter in which less costly blades can be employed than the blades required with cutters of known construction.

Another object of the invention is to provide a face mill gear cutter which is so constructed that the blades can be seated accurately in the cutter head without grinding seating shoulders on the blades.

A further object of the invention is to provide a face mill gear cutter in which the desired accuracy in the seating of the blades can be achieved while at the same time permitting of wider manufacturing tolerances for the blades.

Still another object of the invention is to provide a face mill gear cutter in which all the blades can be held in the cutter head with the same degree of fit, and one blade may be held and positioned just as accurately and as easily as another.

Still further objects of the invention are to provide a more accurate face mill gear cutter than has heretofore been practical, and one which can be trued before sharpening as well as before use.

Other objects of the invention will be apparent hereinafter from the specification and from the recital of the appended claims.

In a face mill cutter constructed according to the present invention, there is a disc secured to the cutter head. This disc, which may be a separate part or integral with the cutter head, has its periphery ground to be coaxial with the axis of the cutter head. The disc serves two purposes; it constitutes a means for quickly and accurately truing the cutter; and it provides a seat for the cutter blades, eliminating the necessity for any seating shoulders on the blades.

In truing an inserted blade cutter constructed according to the present invention, the cutter head is first trued with reference to the axis of the spindle of the truing fixture by mounting the head loosely on the spindle of the truing fixture, rotating the spindle to pass the periphery of the disc under the contact finger of a gage, and shifting the cutter head bodily with reference to the spindle until the gage reads zero for a complete revolution of the head, as described more particularly in the Hartman application above mentioned. The periphery of the disc, and, therefore, the axis of the cutter head is then coaxial with the axis of the truing fixture. The cutter head is then secured to the spindle of the truing fixture, and the blades themselves are trued with reference to the cutter head in the usual way by testing and adjusting the radial position of each blade until it is at the correct distance from the axis of the spindle of the truing fixture. When the cutter is to be used or sharpened, the cutter is mounted loosely on the tool spindle of the gear cutting machine or on the work spindle of the cutter sharpening machine, the spindle is rotated to pass the periphery of the disc under the contact finger of a relatively fixed gage, and during its rotation, the cutter is shifted, if necessary, bodily with reference to the spindle until the gage reads zero for a complete revolution of the spindle. The periphery of the disc is then coaxial with the axis of the spindle and the blades are automatically at the correct radial distances from that axis. The cutter head is then secured to the spindle. It is not necessary, then, to retrue each individual blade of the cutter when the cutter is to be used or sharpened. It takes but a second or so to get the periphery of the disc to run true with the axis of the spindle on which the cutter is mounted, and no adjustment of the blades whatsoever is required.

As already stated, the disc serves not only for truing the cutter, but the face of the disc, which is contiguous to the head, serves, also, as a seat for determining the distance which the cutting portions of the blades project beyond the adjacent front face of the head. The seating face of the disc is ground as a plane face perpendicular to the axis of the head and the bottoms of the blades are ground to rest against this face. It is much cheaper and much faster to grind the bottoms of the blades than it is to grind shoulders on the blades and the seating is more accurate with the present construction.

In the preferred embodiment of the invention, the front face of the disc is so formed that the seat for each blade is much narrower than the width of the bottom of the blade so that a narrow bearing or seat only is provided for the blade. This narrow bearing serves just as well as a full-width bearing for locating the blade, but it has the additional advantage that it permits a wider tolerance on the squareness with which the bottom of the blade is ground with reference to the sides of the blades, thus again reducing the cost of manufacture.

In the preferred embodiment of the present invention, also, the sides of the blade-receiving slots are relieved so as to reduce the area of the bearing or contact of the sides of the blades in the slots. Preferably, the blade slots are formed so as to contact with the blades only adjacent the periphery of the cutter head. With this construction, possibility of compression of the material between the blade slots is eliminated and all of the blades have the same degree of fit in the cutter head.

In the drawings:

Fig. 1 is a plan view of a face mill gear cutter made according to one embodiment of this invention, some of the blades being removed to illustrate the construction more clearly, the upper left-hand quarter of the cutter head being broken away to show the upper or seating face of the truing disc, the lower left-hand quarter of the truing disc being broken away and the blades being removed in this sector in order to better illustrate the structure of the blade slots, and the lower right-hand quarter of the cutter head being broken away to show a section through the head in the plane of the blade-securing bolts;

Figure 1:
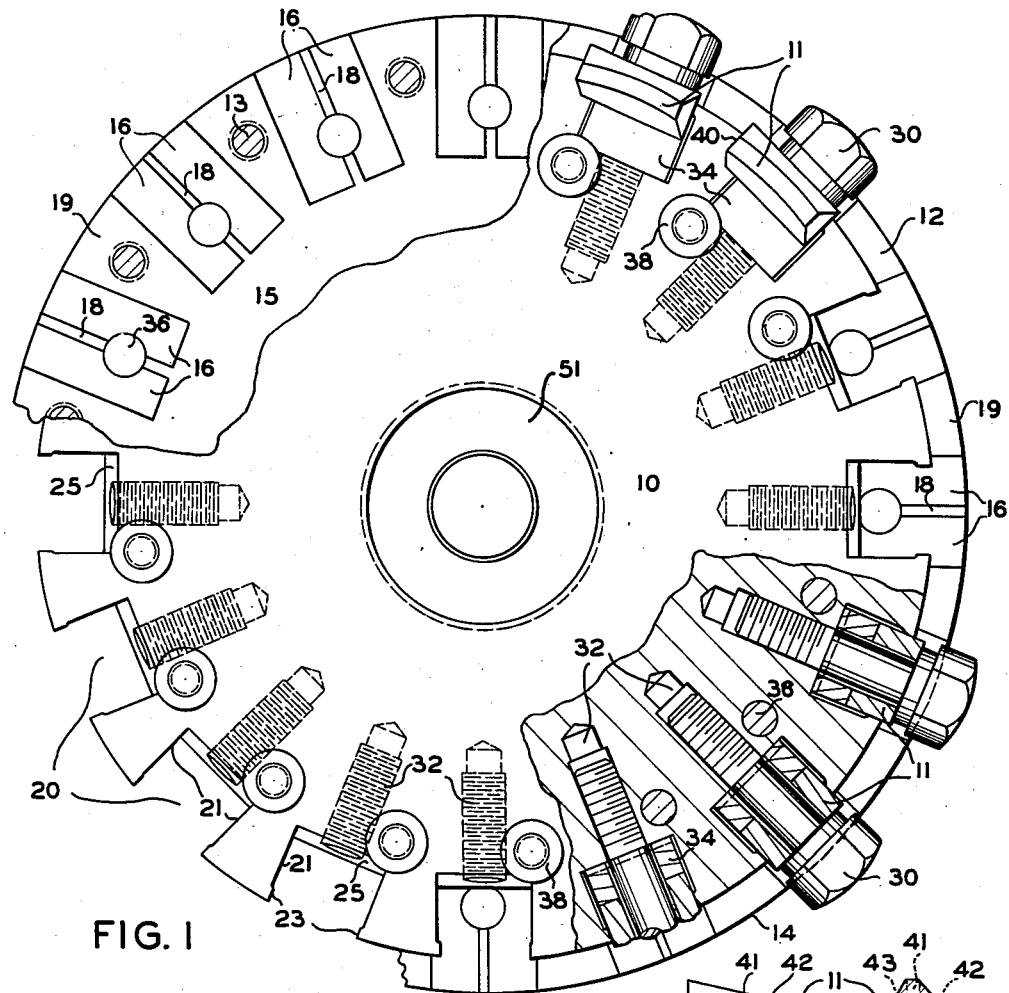
Figure 2:
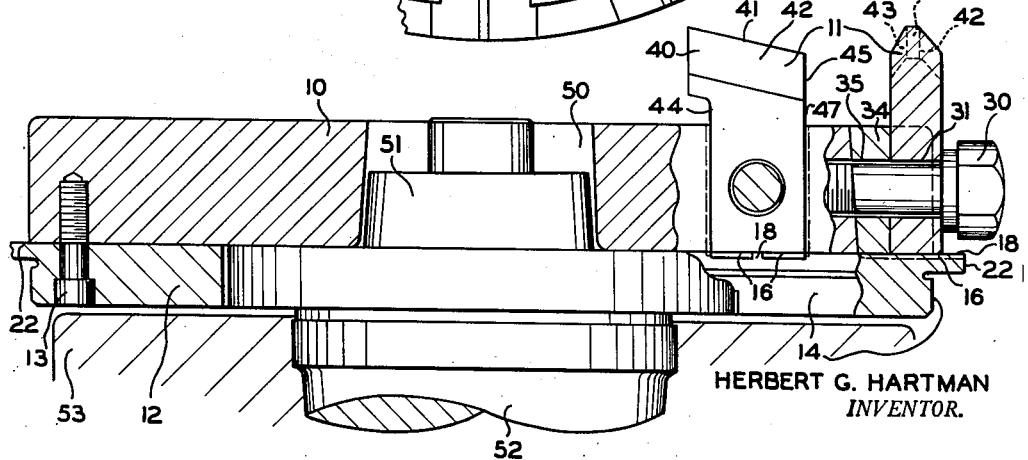
Fig. 2 is a view at right angles to the view of Fig. 1, showing the cutter mounted upon the spindle of a gear cutting or cutter sharpening machine, most of the cutter being broken away and shown in section.

Referring first to Figs. 1 and 2, the cutter illustrated comprises a rotary head 10, a plurality of cutting blades 11, and a truing disc 12.

The truing disc is secured to the cutter head by screws 13. It has a circumferential surface 14 ground to be coaxial with the axis of the cutter head. Its upper or seating face 15 is a plane surface, formed by first grinding this face as a plane perpendicular to the axis of the disc and then straddle-milling parallel recesses 16 in it at spaced intervals around its periphery to form narrow bearing surfaces 18 on which the cutter blades 11 may seat. The construction is such that the upper seating surfaces of the seating portions 18 remain in the same plane as the main surface 15 of the disc, and so are accurately formed. The lands 19 which lie between adjacent sets of recesses 16 also lie in the plane of main surface 15.

The cutter head 10 is provided around its circumference with a plurality of blade-receiving slots 20 which in the embodiment illustrated are identical and equi-spaced. The sides 21 of each slot are relieved for the greater portion of the radial depth of the slot so that lands or bearing surfaces 23 are left on the sides of each slot adjacent the periphery of the head. The inside surface 25 of each slot is inclined with reference to the axis of the head so that the bottom of the slot is further away from the axis of the cutter than the top of the slot.

The cutter blades 11 are secured in the slots 20 by bolts 30 which pass through holes 31 in the shanks of the cutter blades, and holes 35 in wedges 34 and thread into holes 32 drilled into the cutter head. There is a wedge 34 interposed between the inside wall 25 of a slot and the inside of the shank of the blade that is mounted in the slot. Each wedge 34 has an inside face with the same inclination as the inside surface 25 of the slot. These wedges are intended to take the place of the separate shims and wedges provided with conventional type face mill cutters. The wedges 34 permit of adjusting the blades 11 radially in their blade slots when the bolts 30 are loosened. The wedges are adapted to be adjusted axially of the cutter, to effect the desired radial adjustments of the blades, by rotation of the screws 38. These screws thread into the cutter head 10 alongside the wedges 34 and the heads of the screws engage in kerfs formed in the wedges. The holes 35 in the wedges are of greater diameter than the diameter of the shanks of the bolts 30 so that the wedges can be moved up or down in the blade slots. To permit downward movement of the wedges, holes 36 are drilled in the face of the disc 12 to cut away the portions of the seats 18 immediately below the wedges 34. The slots 16 and these holes 36 therefore provide clearance for downward adjustment of the wedges.

Each blade has a cutting portion comprising a front face 40, a tip surface 41, and outside and inside surfaces 42 and 43. The tip, and the side surfaces are relieved back of the front face, and the front face may be sharpened to have side cutting edges at both sides or in the usual manner with side-rake to provide a cutting edge at one side only of the blade. The front face of the cutting portion of the blade may project beyond the front face 44 of the shank portion of the blade, but the rear face 45 of the cutting portion of the blade preferably is made to lie in the same plane with the rear face 47 of the shank of the blade, for the blade does not have to be formed with any shoulder for seating it axially in the cutter head.

The bore 50 of the head of a cutter made according to this invention is made slightly larger in diameter than the nose 51 of the spindle 52 of the gear cutting machine or cutter sharpening machine 53 on which the cutter is to be used or sharpened. It is also made slightly larger than the noses of the spindles of standard truing fixtures. As described in the Hartman application above mentioned, for truing the cutter it is slipped over the nose of the spindle of the truing fixture and the disc 12 is first trued with reference to the axis of the cutter spindle by passing the peripheral surface 14 of the disc under a gauge and shifting the cutter with reference to the spindle until the same reading is had all around the periphery of the disc. Then the cutter is secured to the spindle of the truing fixture and the blades of the cutter are trued in the usual manner with reference to the cutter by passing them under a gauge and shifting them radially with the wedges 34 until all of the blades have the correct radial positions in the cutter head. When a cutter has been once trued, it can be trued on the gear cutting machine simply by use of the truing disc 12; it can be taken off of the gear cutting machine for sharpening and trued on the sharpening machine simply by use of the truing disc 12; and it can be returned again to the gear cutting machine and trued again simply by use of the truing disc 12.

Figure 5:
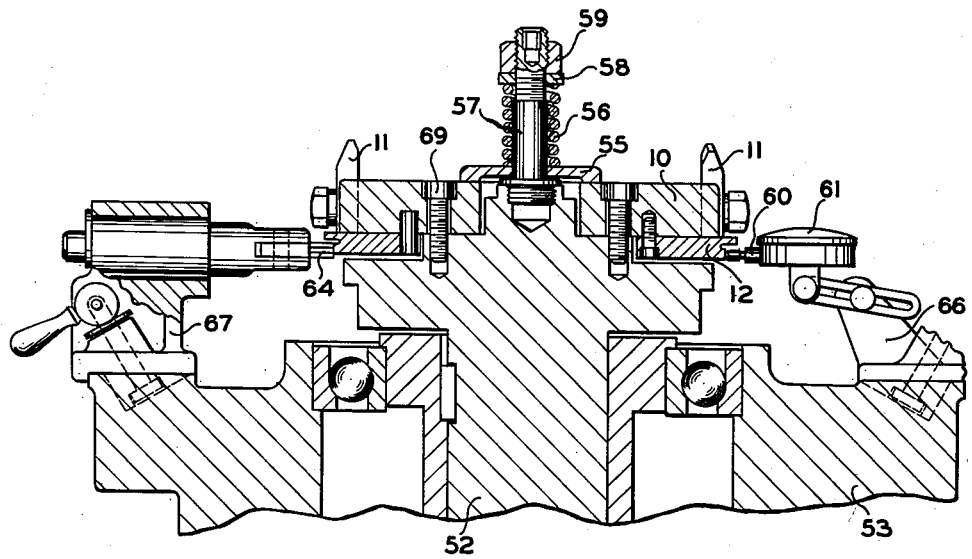
Fig. 5 is a fragmentary sectional view showing a cutter constructed according to this invention mounted upon the tool spindle of a face mill gear cutting machine and illustrating how this cutter may be trued for use on that machine.

Fig. 5 illustrates the method of truing the cutter either on a cutting machine or a sharpening machine. The cutter is placed over the nose of the spindle 52 of the machine and may be held in place by a clamping plate 55 under pressure of the spring 56. The clamping plate is adapted to be mounted upon a stud or post 57 that is threaded into the nose of the spindle. The spring 56 surrounds the post 57 and is interposed between the plate 55 and a washer 58. The tension of this washer can be adjusted by the nut 59 which threads onto the post. With the cutter thus held on the spindle 52, the plunger 60 of the gauge 61 is brought into contact with the truing surface 14 of the disc 12, and the contact member 64 that is adapted to be adjusted radially of the axis of the spindle by a screw (not shown) is brought into engagement with the surface 14 at a point diametrically opposite the point of engagement of the plunger 60. The gauge 61 and contact member 64 are supported, in a manner described more specifically in the Hartman application, from brackets 66 and 67, respectively, that are secured to a relatively stationary part of the machine. Then the spindle 52 is rotated to rotate the disc under the plunger 60. The cutter is then moved bodily with reference to the spindle, if necessary, by adjustment of member 64 until a zero reading is had on the gauge during a full revolution of the disc 12 under the plunger 60. When this is achieved, the cutter is trued, that is, is coaxial of the spindle. Then it may be bolted to the spindle by the screws 69. The post 57 may then be unthreaded from the spindle to remove the clamping disc and the other parts, which are carried by the post, from the machine, and the cutter is ready for use.

To protect the truing surface 14 of the disc from being damaged during handling or use of the cutter, the disc is preferably made, as shown, with a projecting flange or rim 22, which is of greater diameter than the diameter of the truing surface and projects beyond the truing surface to protect it. In the embodiment illustrated, this protecting rim is so made as to be interposed between the cutter head and the truing surface. It could, however, be made to be below the truing surface, that is, at the opposite side of the disc, or obviously protecting rims might be provided both above and below the truing surface.

Figure 4:
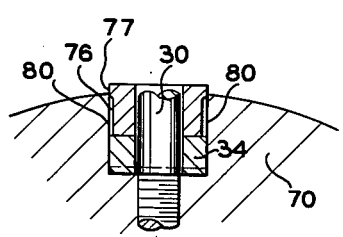
Fig. 4 is a fragmentary sectional view taken at right angles to the view of Fig. 3 and in the plane of the blade securing bolt.
Figure 3:
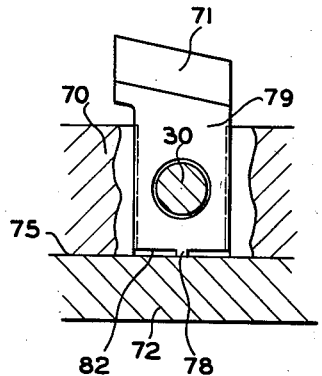
Fig. 3 is a fragmentary view illustrating a modification of the invention.

Various modifications of the invention are possible. Thus, instead of making the disc 12 with narrow seating surfaces 18 and instead of making the blade slots 20 with narrow centering lands 23, the same results might be obtained by providing both forms of seating surfaces on the blades instead of on the truing disc and in the cutter head slots, respectively. This is illustrated in Figs. 3 and 4. Here the truing disc 72, which is otherwise similar to the disc 12, has a completely plane top surface 75, and here the sides 80 of the slots in the cutter head 70, which is otherwise of similar construction to the cutter head 10, are made plane surfaces without relief for their full radial lengths. Here, however, the cutter blades 71 are formed with relieved side surfaces 76 and with relieved bottom surfaces 82. The relieved side surfaces 76 provide lands 77 adjacent the outside surfaces 76 of the shanks of the blades which constitute narrow bearings or contact surfaces with the sides 80 of the blade slots. The bottom surfaces 82 of each blade is relieved to provide a narrow central land 78 whose bottom is ground as a plane surface to rest upon the plane upper surface 75 of the disc 72. The blades, as before, are secured in position by bolts 30 which pass through the shanks of the blades and through the wedges 34 and thread into the cutter head 70. A cutter constructed as disclosed in Figs. 3 and 4 is trued in the same manner as the cutter disclosed in Figs. 1 and 2 and has the same advantages.

While the invention has been described particularly in connection with an inserted blade type face mill cutter, it will be understood that this invention has advantages also in relation to integral blade type cutters, for by making an integral blade type cutter with an integral truing disc or by securing such a disc to an integral blade cutter, the same saving of time in truing of the cutter may be achieved as with the inserted blade type cutter. Heretofore, there has been no way of truing an integral blade type face mill cutter on a gear cutting machine. By making the cutter according to the present invention, the cutting blades are relieved with reference to an axis which coincides with the axis of the disc. When the cutter is placed on the gear cutting machine or on a sharpening machine, then, it is but a second's work to true the disc with the axis of the tool spindle, as described above, and secure the cutter to the spindle in correct position. This insures that all blades of the cutter will track properly.

It will further be understood that while the invention has been described in connection with a face mill gear cutter having equi-spaced blades, it is applicable to any type of such cutter. Moreover, it will be understood that the invention is not limited to face mill type cutters but may be employed, also, in connection with other types of cutters such as disc-type rotary milling cutters. In general, it may be said that while certain embodiments of the invention have been described, the invention is capable of further modification, and the present application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A face mill gear cutter comprising a rotary head having a plurality of blade-receiving slots around its periphery, a cylindrical truing disc secured to one of the side faces of the head, a plurality of removable cutting blades, which have their cutting portions projecting beyond the other side face of the head and which have corresponding side cutting edges and which are secured, respectively, in separate slots, coaxially with the head with their bottoms seating against one side face of said disc, and means for adjusting the blades individually radially of the axis of said head, said disc having an outside, cylindrical, uninterrupted peripheral, ground surface, ground coaxial with the head, whereby to serve for truing and positioning the cutter for use.

2. A rotary gear cutter having a plurality of peripherally arranged slots, and blades mounted in said slots, each of the opposite sides of a slot having a narrow land thereon which projects laterally beyond the remainder of that side of the slot and which is of less radial length than the radial length of said remainder of that side of the slot, the lands at opposite sides of each slot projecting toward one another to form narrow bearing surfaces against which the opposite sides of the blade which is mounted in that slot seat.

3. A rotary cutter comprising a rotary head having a plurality of peripherally-disposed blade-receiving slots, and blades mounted in said slots, each of said blades having a pair of opposite side faces, each of said slots having a pair of opposite side faces between which opposite side faces of a blade are mounted, each side face of one pair of said opposite side faces having a narrow land projecting laterally therefrom which extends in the direction of the height of the blade and which has a smaller radial length than the radial length of the remainder of said side face, and the lands of said one pair of opposite side faces forming narrow bearing surfaces between said one pair of opposite side faces and the cooperating pair of opposite side faces whereby each blade may have contact along narrow portions of the sides of the blade only with the opposite sides of the slot in which the blade is mounted.

4. A face mill gear cutter comprising a rotary head having a plurality of blade-receiving slots, a plurality of cutting blades mounted in said slots to project beyond one side face of the head, and a seating member secured to the other side face of the head, said seating member having a plurality of angularly-spaced narrow lands projecting therefrom axially of the head, one of said lands registering with each slot and forming a seat against which the bottom of one of said blades rests, each of said lands having a width considerably less than the width of the bottom of the blade seated on said land.

5. A face mill gear cutter comprising a rotary head having a plurality of peripherally-arranged blade-receiving slots, a plurality of cutting blades mounted in said slots to project beyond one side face of the head, and a seating member secured to the other side face of the head, said seating member having a plurality of angularly-spaced narrow lands projecting therefrom axially of the head, one of said lands registering with each slot and forming a seat against which the bottom of one of said blades rests, each of said lands having a width less than the width of the bottom of the blade seated on said land, and said seating member having an outside, cylindrical, peripheral, ground surface, ground coaxial with said head to provide a surface for truing and positioning the cutter for use.

6. A face mill gear cutter comprising a rotary head having a plurality of blade-receiving slots, and a plurality of cutting blades mounted in said slots with their cutting portions projecting beyond one side face of the head in the general direction of the axis of the head, each of the opposite side faces of each blade having a narrow land projecting laterally therefrom which extends in the direction of the height of the blade and which seats against the adjacent face of the slot in which the blade is mounted to provide a narrow bearing surface between a side of the blade and said adjacent side face of the slot.

7. A face mill gear cutter comprising a rotary head having a plurality of peripherally-arranged blade-receiving slots, a plurality of cutting blades mounted in said slots with their cutting portions projecting beyond one side face of the head in the general direction of the axis of the head, and a disc secured to the opposite side face of the head, each of the opposite side faces of each blade having a narrow land projecting laterally therefrom which extends in the direction of the height of the blade and seats against the adjacent side face of the slot in which the blade is mounted to provide a narrow bearing surface between said blade and said adjacent side face of the slot, and each blade having a narrow land projecting axially downwardly from its bottom which seats against the adjacent side face of said disc and provides a narrow bearing surface between the bottom of the blade and said disc.

HERBERT G. HARTMAN.

REFERENCES CITED

The following references are of record in the file of this patent:

UNITED STATES PATENTS

| Number | Name | Date |
|---|---|---|
| 1,236,834 | Gleason | Aug. 14, 1917 |
| 1,373,956 | Farnum | Apr. 5, 1921 |
| 1,383,707 | Farnum | July 5, 1921 |
| 1,622,234 | Drake | Mar. 22, 1927 |
| 1,820,416 | Wildhaber | Aug. 25, 1931 |
| 1,836,662 | Head | Dec. 15, 1931 |
| 1,913,486 | Head | June 13, 1933 |
| 1,949,014 | Gleason | Feb. 27, 1934 |
| 1,969,837 | Earl | Aug. 14, 1934 |
| 2,126,004 | Gleason | Aug. 9, 1938 |
| 2,129,056 | Gleason | Sept. 6, 1938 |
| 2,192,343 | Earl | Mar. 5, 1940 |
| 2,260,605 | Carlsen | Oct. 28, 1941 |
| 2,315,147 | Wildhaber | Mar. 30, 1943 |
| 2,329,804 | Wildhaber | Sept. 21, 1943 |
| 2,372,241 | Wildhaber | Mar. 27, 1945 |
| 2,392,278 | Wildhaber | Jan. 1, 1946 |
| 2,506,082 | Hartman | May 2, 1950 |